United States Patent
Mace (10) Patent No.: US 9,015,424 B2
(45) Date of Patent: Apr. 21, 2015

(54) WRITE TRANSACTION MANAGEMENT WITHIN A MEMORY INTERCONNECT

(75) Inventor: Timothy Charles Mace, Cambridge (GB)

(73) Assignee: ARM Limited, Cambridge (GB)

( * ) Notice: Subject to any disclaimer, the term of this patent is extended or adjusted under 35 U.S.C. 154(b) by 47 days.

(21) Appl. No.: 13/586,131

(22) Filed: Aug. 15, 2012

(65) Prior Publication Data

US 2014/0052933 A1 Feb. 20, 2014

(51) Int. Cl.
*G06F 12/00* (2006.01)
*G06F 12/08* (2006.01)

(52) U.S. Cl.
CPC ................................ *G06F 12/0835* (2013.01)

(58) Field of Classification Search
CPC ............ G06F 12/0815; G06F 12/0828; G06F 12/0844
USPC .................. 711/146, 118, 141; 345/541, 557
See application file for complete search history.

(56) References Cited

U.S. PATENT DOCUMENTS

| 6,898,675 B1* | 5/2005 | Okpisz et al. ................. 711/141 |
| 2003/0204679 A1* | 10/2003 | Blankenship ................. 711/146 |
| 2009/0271583 A1* | 10/2009 | Kershaw et al. .............. 711/163 |
| 2009/0319707 A1* | 12/2009 | Laycock et al. .............. 710/110 |
| 2011/0072178 A1* | 3/2011 | Mace ............................ 710/244 |
| 2012/0079211 A1* | 3/2012 | Laycock et al. .............. 711/143 |

* cited by examiner

*Primary Examiner* — Gurtej Bansal
(74) *Attorney, Agent, or Firm* — Nixon & Vanderhye P.C.

(57) ABSTRACT

A memory interconnect between transaction masters and a shared memory. A first snoop request is sent to other transaction masters to trigger them to invalidate any local copy of that data they may hold and for them to return any cached line of data corresponding to the write line of data that is dirty. A first write transaction is sent to the shared memory. When and if any cached line of data is received from the further transaction masters, then the portion data is used to form a second write transaction which is sent to the shared memory and writes the remaining portions of the cached line of data which were not written by the first write transaction in to the shared memory. The serialization circuitry stalls any transaction requests to the write line of data until the first write transaction.

14 Claims, 3 Drawing Sheets

WRITE TRANSACTION MANAGEMENT WITHIN A MEMORY INTERCONNECT

BACKGROUND OF THE INVENTION

1. Field of the Invention

This invention relates to the field of data processing systems. More particularly, this invention relates to the management of write transactions within a memory interconnect that connects a shared memory and a plurality of transaction masters.

2. Description of the Prior Art

It is known to provide data processing systems that include a shared memory and a plurality of transaction masters. Such arrangements are often found within system-on-chip integrated circuits. Within such systems the different transaction masters can each generate write transactions which write data values into the address space of the shared memory. The shared memory can be accessed by more than one transaction master.

It is also known within such systems that a transaction master may include a local cache memory. Providing a local cache memory within a transaction master increases the speed and efficiency of that transaction master. Cache memories typically provide higher speed access to data with a lower energy cost.

However, a problem with providing local cache memories within such systems is that multiple copies of data from a given memory address are present. For example, a given line of data (a plurality of bytes of data) may be present both within a given range of addresses of the shared memory and in a line of a local cache memory corresponding to those addresses within the shared memory. When multiple copies of data for the same memory addresses exist within the system, then mechanisms may be required to ensure the coherency of those different copies. As an example, if the version of the data stored within a local cache is updated, then this updated data will be the most up-to-date copy of the data for those memory addresses within the system. Should a different transaction master then seek to read data from the shared memory at addresses corresponding to those which have been updated in the locally cached copy, then the shared memory would, without coherence mechanisms in place, return an out-of-date copy of the data concerned. In order to deal with this problem, it is known to provide coherency mechanisms, such as snoop mechanisms, within coherent memory systems which include a shared memory and one or more local cache memories.

One way in which such coherence mechanisms may work concerns the management of write transactions. If a transaction master seeks to make a write back to the shared memory, then the coherence mechanisms may issue snoop requests to any local cache memories within the system which could be holding a copy of the line of data to which the write transaction is being made. If any of such local cache memories holds a more up-to-date version of the line of data than is held within the shared memory, then this more up-to-date version of the line of data should be written back to the shared memory before the write transaction then is made to that shared memory.

This ensures that a hazard condition does not arise in which the write transaction is inappropriately first made to the shared memory and then is overwritten when the line of data stored within one of the local cache memories and overwrites what may be a more up-to-date version of that line of data, i.e. the coherency mechanism ensure the ordering in time of the write transactions to the shared memory is maintained. In order to avoid this possibility, a write to a line of data within the shared memory can be stalled or buffered within the memory interconnect until the coherency mechanisms can ensure that any copies of that line of data held within local caches within the system, and that are more up-to-date than the copy in the shared memory, have been written back to the shared memory. The stalled or buffered write transaction can then proceed to write to the shared memory as the writes to the shared memory will then occur in the correct order. While this approach has the advantage of ensuring memory consistency and correctness, it has the disadvantage of requiring buffer storage within the memory interconnect or the stalling of the transaction master which generated a stalled write request.

SUMMARY OF THE INVENTION

Viewed from one aspect the present invention provides a memory interconnect apparatus for connecting a shared memory with a first transaction master and a second transaction master, at least said second transaction master including a local cache memory, said memory interconnect apparatus comprising:

write control circuitry configured to respond to a write unique transaction received from said first transaction master to write data from one or more selected portions of a write line of data to said shared memory by:
  (i) storing portion data identifying said one or more selected portions within said write line of data;
  (ii) sending a first snoop request to said second transaction master requesting, if said local cache of said second transaction master is storing a cached line of data corresponding to said write line of data within said shared memory, said second transaction master to invalidate said cached line of data within said local cache and to send said cached line of data to said write control circuitry;
  (iii) sending to said shared memory a first write transaction for writing into said shared memory at least said data from said one or more selected portions of said write line of data without waiting for any said cached line of data to be received from said second transaction master; and
  (iv) when and if any said cached line of data is received from said second transaction master, using said portion data to identify one or more remaining portions of said cached line of data that do not correspond to said one or more selected portions within said write line of data and sending to said shared memory a second write transaction for writing into said shared memory data from said one or more remaining portions of said cached line of data but not data from said cached line of data corresponding to said one or more selected portions of said write line of data; and serialisation circuitry coupled to said write control circuitry and configured to stall any transaction requests to said shared memory corresponding to said write line of data until said first write transaction, any invalidation of said cached line of data and any said second write transaction are indicated as completed.

The present technique recognises that it is not necessary either to stall a write transaction and its issuing transaction master pending the flushing of any more up-to-date versions of the line of data concerned back to the shared memory or to buffer the write transaction pending such flushing operations as it is possible instead to send the write transactions to the shared memory in what would appear to be the incorrect order providing certain mechanisms are put in place. These are that data identifying which portions of the line of data have been written by the write transaction from the first transaction master is stored and then stopping any second write transaction which may be returned from the second transaction master from overwriting those portions of the line of data within the shared memory that have already been written by the first transaction master. The serialisation circuit also blocks any other transactions to the shared memory corresponding to the line of data that arise until the "out-of-order" write status of the line of data has been resolved.

The technique allows the write transactions from the first transaction master and the second transaction master to take place in what would normally be regarded as the incorrect order providing data storing identification of which portions of the write line are written by the first write transaction is stored and used to prevent those portions from being overwritten by data from the cache line of data of the second write transaction. The storage requirements for the portion data are significantly less than the storage requirements for a full write transaction which would include the write line of data. In this way both increased storage requirements within the memory interconnect and disadvantageous stalling of the first transaction master may be avoided.

The serialisation circuitry serves to prevent any transaction requests sent to the shared memory until after the period when the first write transaction, any invalidation of the cache line of data and any second write transaction have indicated as completed. This ensures that the out-of-order writing of the transactions to the shared memory does not result in another master inappropriately reading the incorrect data from the shared memory at a point before the inconsistency due to the out-of-order writes has been overcome.

It is possible that the first write transaction could write data to the whole of the corresponding line within the shared memory. The portions of that line within the shared memory which were not actually selected to be written in the write unique transaction would then be overwritten by the second write transaction returning data from the cache line of data within the local cache memory of the second transaction master. However, in some embodiments energy may be saved when the first write transaction writes only the one or more selected portions of the write line of data to the shared memory. The remaining portions of the line of data within the shared memory will then be written by any second write transaction.

It will be appreciated that the portions of the line of data could be divided in a variety of different ways. However, a common way of dividing lines of data which may be usefully used by the present technique is when the write line of data comprises a plurality of bytes of data among which the selected portions may be identified by byte lane strobe data indicating which of the plurality of bytes correspond to the selected bytes.

When the portion data is formed of byte lane strobe data, the first write transaction may be formed by using the byte lane strobe data to provide a mask for selecting which bytes within the write line of data should be bytes written to the shared memory by the first write transaction.

In this context, the second write transaction may be formed by similarly using the byte lane strobe data to provide a mask (e.g. inverted) for selecting which bytes within the cache line of data should be bytes written to the shared memory by the second write transaction.

The first snoop request sent to the second transaction master may or may not result in a snoop response. In some embodiments, it is possible that a snoop request to return any copy of a cache line and then invalidate that cache line may be considered completed if no response is received within a given amount of time. However, in other embodiments, it may be more convenient if the write control circuitry is configured to receive a first snoop response from the second transaction master that positively indicates that the invalidation has completed. Providing for such a snoop response makes it easier to cope with systems in which the times individual transaction masters may take to process snoop requests vary due to the configuration or state of a transaction master.

The above described technique has concerned write unique transactions which write to one or more selected portions of a write line of data (typically not the full line of data). Another form of write transaction which may be encountered is a write line unique transaction which serves to write a full line of data to the shared memory. In this situation the write control circuitry may be configured to send a snoop request to the second master to trigger it to invalidate any corresponding stored cache line of data held within the local cache. The cache line of data if present need not be returned and written to the shared memory as it will be fully overwritten as a consequence of the write line unique transaction. Accordingly, the write line unique transaction may give rise to a third write transaction for writing into the shared memory the full write line without having to wait for any snoop response to the invalidation request. The serialisation circuitry is configured to stall any other transaction requests to the shared memory corresponding to the write line of data until the second snoop response and the third write transaction are indicated as completed. This avoids any intervening transaction being returned anything other than the line of data written by the write line unique transaction.

The third write transaction may be the write line unique transaction in an unaltered form. The same is true of the first write transaction previously referred to which may be the write unique transaction in an unaltered form.

Viewed from another aspect the present invention provides apparatus for processing data comprising:

a shared memory;
a first transaction master
a second transaction master including a local cache memory; and
memory interconnect circuitry having:
write control circuitry configured to respond to a write unique transaction received from said first transaction master to write data from one or more selected portions of a write line of data to said shared memory by:
(i) storing portion data identifying said one or more selected portions within said write line of data;
(ii) sending a first snoop request to said second transaction master requesting, if said local cache of said second transaction master is storing a cached line of data corresponding to said write line of data within said shared memory, said second transaction master to invalidate said cached line of data within said local cache and to send said cached line of data to said write control circuitry;
(iii) sending to said shared memory a first write transaction for writing into said shared memory at least said data from said one or more selected portions of said write line of data without waiting for any said cached line of data to be received from said second transaction master; and
(iv) when and if any said cached line of data is received from said second transaction master, using said portion data to identify one or more remaining portions of said cached line of data that do not correspond to said one or more selected portions within said write line of data and sending to said shared memory a second write transaction for writing into said shared memory data from said one or more remaining portions of said cached line of data but not data from said cached line of data corresponding to said one or more selected portions of said write line of data; and serialisation circuitry coupled to said write control circuitry and configured to stall any transaction requests to said shared memory corresponding to said write line of data until said first write transaction, any invalidation of said cached line of data and any said second write transaction are indicated as completed.

The first transaction master may or may not itself have a cache for storing local copies of data from the shared memory, e.g. it may have a local cache which stores data to be read by the first transaction master, but does not permit at least some data written by the first transaction master (e.g. data marked as not cached) to be stored therein. In such a circumstance any writes by the first transaction master will result in write unique transactions or write line unique transactions that will potentially stall the first transaction master unless they are sent to the shared memory without delay.

One form of the first transaction master to which the present technique is suited is that of a graphics processing unit wherein the data for writing is pixel data for writing to a frame buffer stored within a shared memory. Such graphics processing units may seek to write out their result data to the frame buffer without relying upon any local cache which could delay the arrival of the pixel data to the frame buffer.

Although it is not a requirement, in some embodiments the first transaction master, the second transaction master and the memory interconnect circuitry may all be formed within a single integrated circuit. Within the same integrated circuit such high speed and low power advantages as provided by the present techniques in combination with a low circuit overhead of the memory interconnect are advantageous. The shared memory may or may not be formed on the same integrated circuit.

Viewed from another aspect the present invention provides memory interconnect apparatus for connecting a shared memory means for storing data with a first transaction master means for issuing transactions and a second transaction master means for issuing transactions, at least said second transaction master means including a local cache memory means for storing data, said memory interconnect apparatus comprising:

write control means for responding to a write unique transaction received from said first transaction master means to write data from one or more selected portions of a write line of data to said shared memory means by:

(i) storing portion data identifying said one or more selected portions within said write line of data;

(ii) sending a first snoop request to said second transaction master means requesting, if said local cache means of said second transaction master means is storing a cached line of data corresponding to said write line of data within said shared memory means, said second transaction master means to invalidate said cached line of data within said local cache means and to send said cached line of data to said write control means;

(iii) sending to said shared memory means a first write transaction for writing into said shared memory means at least said data from said one or more selected portions of said write line of data without waiting for any said cached line of data to be received from said second transaction master means; and (iv) when and if any said cached line of data is received from said second transaction master means, using said portion data to identify one or more remaining portions of said cached line of data that do not correspond to said one or more selected portions within said write line of data and sending to said shared memory means a second write transaction for writing into said shared memory means data from said one or more remaining portions of said cached line of data but not data from said cached line of data corresponding to said one or more selected portions of said write line of data; and serialisation means, coupled to said write control means, for stalling any transaction requests to said shared memory means corresponding to said write line of data until said first write transaction, any invalidation of said cached line of data and any said second write transaction are indicated as completed.

Viewed from a further aspect the present invention provides a method of connecting a shared memory with a first transaction master and a second transaction master, at least said second transaction master including a local cache memory, said method comprising the steps of:

using write control circuitry to respond to a write unique transaction received from said first transaction master to write data from one or more selected portions of a write line of data to said shared memory by:

(i) storing portion data identifying said one or more selected portions within said write line of data;

(ii) sending a first snoop request to said second transaction master requesting, if said local cache of said second transaction master is storing a cached line of data corresponding to said write line of data within said shared memory, said second transaction master to invalidate said cached line of data within said local cache and to send said cached line of data to said write control circuitry;

(iii) sending to said shared memory a first write transaction for writing into said shared memory at least said data from said one or more selected portions of said write line of data without waiting for any said cached line of data to be received from said second transaction master; and (iv) when and if any said cached line of data is received from said second transaction master, using said portion data to identify one or more remaining portions of said cached line of data that do not correspond to said one or more selected portions within said write line of data and sending to said shared memory a second write transaction for writing into said shared memory data from said one or more remaining portions of said cached line of data but not data from said cached line of data corresponding to said one or more selected portions of said write line of data; and stalling any transaction requests to said shared memory corresponding to said write line of data until said first write transaction, any invalidation of said cached line of data and any said second write transaction are indicated as completed.

The above, and other objects, features and advantages of this invention will be apparent from the following detailed description of illustrative embodiments which is to be read in connection with the accompanying drawings.

DESCRIPTION OF THE EMBODIMENTS

Figure 1:
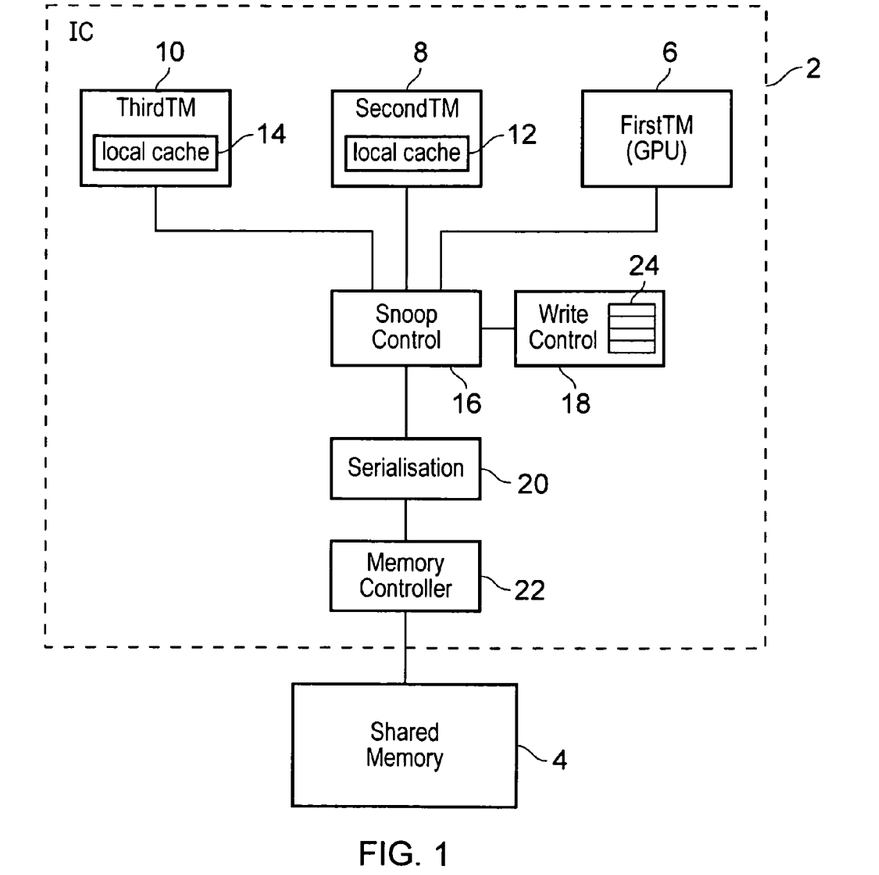
FIG. 1 schematically illustrates an integrated circuit including multiple transaction masters and coupled to a shared memory.

FIG. 1 schematically illustrates an integrated circuit 2 coupled to a shared memory 4. The integrated circuit 2 includes a first transaction master 6, a second transaction master 8 and a third transaction master 10. The second transaction master 8 includes a local cache memory 12 and the third transaction master 10 includes a local cache memory 14. Coherency management mechanisms within the integrated circuit include snoop control circuitry 16, write control circuitry 18 and serialisation circuitry 20. A memory controller 22 is responsible for issuing memory transactions to the shared memory 4. The write control circuitry 18 includes a buffer 24 for storing portion data formed of byte lane strobes for write unique transactions. A transaction master 6, 8, 10 may be configured to locally cache some, but not all data. Thus a master 6, 8, 10 may perform a write that is marked as not cached and this will trigger a write unique or a write line unique.

The snoop control circuitry 16 manages snoop requests and snoop responses generated as a consequence of memory transactions issued by the transaction masters 6, 8, 10. These snoop requests and snoop responses control the coherence of the data between the copies of data which are stored within the local caches 12, 14 and the copy of that data stored within the shared memory 4. As an example, should the first transaction master 6 seek to read a line of data from the shared memory 4, then the snoop control circuitry 16 may first check whether or not a more up-to-date copy of that line of data is present within one of the local caches 12, 14. If such a more up-to-date copy is available or even a more easily and rapidly accessible copy of the same data is available in either of the local caches 12, 14, then the read may be serviced from these local copies rather than from the shared memory 4. This can save energy and time as well as ensuring that the most up-to-date version of the line of data is read.

In the example illustrated the first transaction master 6 may be a graphics processing unit which does not cache any data for writing to the shared memory 4. Accordingly, the first transaction master may issue write unique transactions or write line unique transactions to the shared memory 4 in accordance with the AXI memory interconnect techniques designed by ARM Limited of Cambridge, England and described in the AMBA AXI and ACE Protocol Specification. Reference to these techniques gives further details of the behaviour of write unique transactions and write line unique transactions.

The write control circuitry 18 which incorporates the buffer 24 serves in conjunction with the serialisation circuitry 20 to re-order what would normally be a flushing write from a local cache memory followed by a write unique transaction or a write line unique transaction. This avoids having to buffer the write unique transaction or write line unique transaction in full as well as any following write transactions which may arise before the leading write transaction is resolved (or in the alternative avoids, in a system without buffer storage, the need to stall the master which generated the write unique transaction or the write line unique transaction). An example of the behaviour of the write control circuitry 18 and the serialization circuitry 20 in response to a write unique transaction and a write line unique transaction is described, respectively, in relation to FIGS. 2 and 3.

Figure 2:
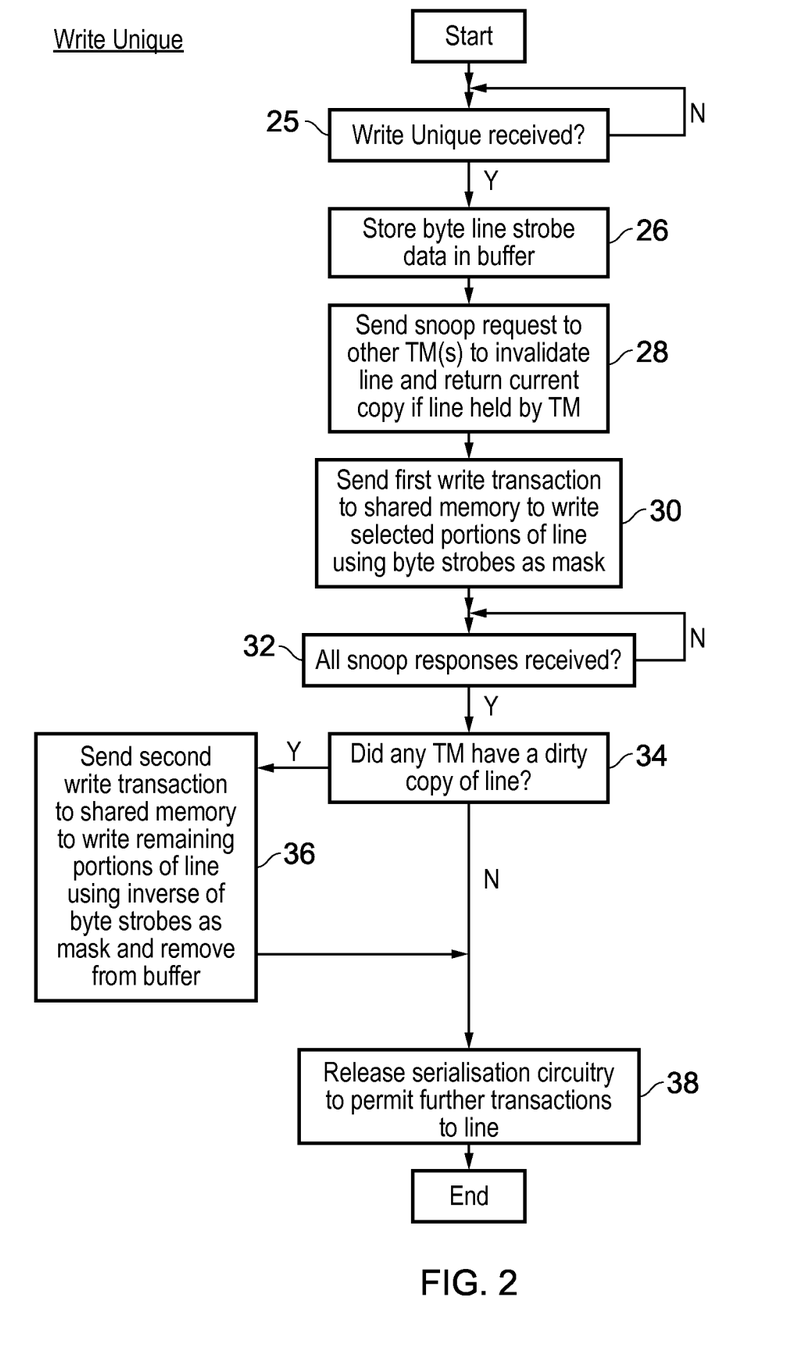
FIG. 2 is a flow diagram schematically illustrating the action of write control circuitry in response to a write unique transaction.

In FIG. 2 processing waits at step 25 for a write unique transaction to be received from the first transaction master 6. At step 26 portion data corresponding to the byte lane strobe data is stored into buffer 24. The byte lane strobe data comprises a bit for each byte within the line of data which is to be written in the write unique transaction that was received at step 25. As an example, if the line of data to be written comprises four 32-bit words of data, then this corresponds to 16 bytes of data and accordingly the byte lane strobe data will be a 16-bit value with one bit corresponding to each byte within the write line of data. The value of each bit indicates whether or not the corresponding byte was written in the write unique transaction. The buffer 24 can have a number of entries within it sufficient such that multiple write unique transactions or write line unique transactions may have their portion data stored therein pending any necessary flush of a cached line of data from a local cache 12, 14.

At step 28 the write control circuitry (in combination with the snoop control circuitry) serves to send a snoop request to other transaction masters 8, 10. This snoop request is to invalidate any local copy of the line of data to which the write unique transaction corresponds and to return a current copy of that line of data if such is held by the receiving transaction master and is more up-to-date than the copy stored within the shared memory 4 (e.g. is marked as dirty).

At step 30, the write control circuitry 18 sends a first write transaction to the shared memory 4 to write the selected portions of the write line of data into the shared memory 4. These selected portions may be indicated by the byte lane strobe signals which are used by the memory controller 22 as a mask to indicate which bytes within the write line of data should be written into the corresponding bytes of the corresponding line within the shared memory 4. It will be noted that the first write transaction sent to the shared memory 4 is issued before any responses to the snoop requests have been received. Accordingly, no buffer storage for the data of the first write transaction corresponding to the write unique transaction needs to be provided within the memory interconnect as the data is sent without delay to the shared memory 4 via the serialisation circuitry 20 and the memory controller 22. The buffer 24 stores the portion data in the form of the byte lane strobe data so that it may select from any cached line of data returned in response to the snoop request those bytes which do need writing to the shared memory 4 as they have not been written by the first write transaction.

Step 32 waits until all snoop responses have been received from the transaction masters 8, 10. Step 34 then determines whether any of the snoop responses indicated that a transaction master had a dirty copy of the line of data corresponding to the write unique transaction. If such a dirty copy of the line of data was present within any of the local caches 12, 14, then step 36 serves to send a second write transaction to the shared memory 4 to write the remaining portions of the write line of data into the shared memory using an inverse of the byte strobe data as a mask. The byte strobe data can then be removed from the buffer 24. The cached line of data will be returned from the transaction master 8, 10 which received the snoop request if it contains that cached line of data and it is dirty. The write control circuitry 18 can then form the second write transaction using the byte lane strobe data. If the determination at step 34 is that none of the transaction masters have a dirty copy of the line of data, then step 36 is bypassed.

Step 38 serves to release the point of serialisation circuitry 20 to permit further transactions to the line of data concerned within the shared memory 4. The point of serialisation circuitry 20 serves to block such transactions following the arrival of the first write transaction until the first write transaction, any invalidation of the cached line within the local caches 12, 14 and any second write transaction have been indicated as completed. This indication of completion may or may not mean that the actual write or invalidation has taken place, but rather that it has or will take place with a guarantee of the correct ordering. For example, the first write transaction may have been sent to the memory controller 22, but not actually have yet been made to the shared memory 4, but the memory controller 22 has taken over responsibility for ensuring that any later transaction will not overtake an earlier transaction in a manner that could give rise to a data hazard.

Figure 3:
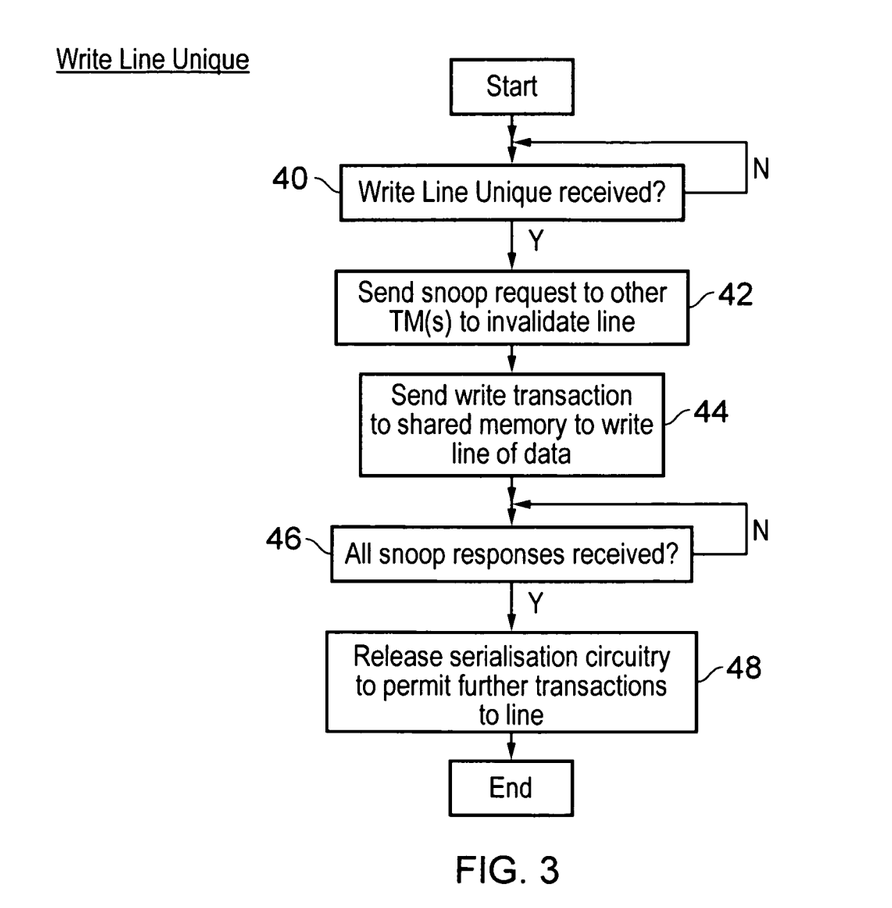
FIG. 3 is a flow diagram schematically illustrating the action of the write control circuitry in response to a write line unique transaction.

FIG. 3 illustrates the behaviour of the write control circuitry 18 and the serialisation circuitry 20 in response to a write line unique transaction. A write line unique transaction writes a full line of data. This may correspond to both a full line of data within a local cache 12, 14 and a full line of data within the shared memory 4. Step 40 waits until a write line unique transaction is received from the first transaction master 6. Step 42 then sends snoop requests to the other transaction masters 8, 10 to invalidate any copy of that line of data which they hold. There is no need for these transaction masters 8, 10 to return any cached copy of that line of data that they may hold since the full line will be overwritten by the write line unique transaction. Step 44 sends the write transaction (third write transaction) to the shared memory 4 to write the line of data into the shared memory 4. Step 46 waits for all snoop responses to be received indicating that any copies of the line of data held within local cache memories 12, 14 have been invalidated. Step 48 then releases the serialisation circuitry 20 to permit further transactions to the line of data concerned to take place. Ensuring that any cached copies of the line of data have been invalidated before further transactions can proceed helps ensure data hazards do not arise.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A memory interconnect apparatus for connecting an external shared memory with a first transaction master and a second transaction master, at least said second transaction master including a local cache memory, said memory interconnect apparatus comprising:
    write control circuitry configured to respond to a write unique transaction received from said first transaction master to write data from one or more selected portions of a write line of data to said shared memory by:
    (i) storing portion data identifying said one or more selected portions within said write line of data;
    (ii) sending a first snoop request to said second transaction master requesting, if said local cache of said second transaction master is storing a cached line of data corresponding to said write line of data within said shared memory, said second transaction master to invalidate said cached line of data within said local cache and to send said cached line of data to said write control circuitry;
    (iii) sending to said shared memory a first write transaction for writing into said shared memory at least said data from said one or more selected portions of said write line of data without waiting for any said cached line of data to be received from said second transaction master; and
    (iv) when said cached line of data is received from said second transaction master, using said portion data to identify one or more remaining portions of said cached line of data that do not correspond to said one or more selected portions within said write line of data and sending to said shared memory a second write transaction for writing into said shared memory data from said one or more remaining portions of said cached line of data but not data from said cached line of data corresponding to said one or more selected portions of said write line of data; and
    serialisation circuitry coupled to said write control circuitry and configured to stall any transaction requests to said shared memory corresponding to said write line of data until said first write transaction, any invalidation of said cached line of data and any said second write transaction are indicated as completed.

2. A memory interconnect apparatus as claimed in claim 1, wherein said first write transaction writes only said one or more selected portions of said write line of data to said shared memory.

3. A memory interconnect apparatus as claimed in claim 1, wherein said write control circuitry is configured to receive a first snoop response from said second transaction master indicating that said invalidation has completed.

4. A memory interconnect apparatus as claimed in claim 1, wherein said write control circuitry configured to respond to a write line unique transaction received from said first transaction master to write a full write line of data to said shared memory by:
    (i) sending a second snoop request to said second master requesting, if said local cache of said second master is storing a full cached line of data corresponding to said full write line of data within said shared memory, said second transaction master to invalidate said full cached line of data within said local cache; and
    (ii) sending to said shared memory a third write transaction for writing into said shared memory said full write line of data without waiting for any second snoop response to said second snoop request; and
    said serialisation circuitry is configured to stall any transaction requests to said shared memory corresponding to said full write line of data until said second snoop response is received and said third write transaction is indicated as completed.

5. A memory interconnect apparatus as claimed in claim 1, wherein said write line of data comprises a plurality of bytes of data, said one or more selected portions comprise one or more selected bytes of said plurality of bytes and said portion data comprises byte lane strobe data indicating which of said plurality of bytes correspond to said one or more selected bytes.

6. A memory interconnect apparatus as claimed in claim 5, wherein said first write transaction is formed using said byte lane strobe data to form a mask for selecting which bytes within said write line of data should be bytes written to said shared memory by said first write transaction.

7. A memory interconnect apparatus as claimed in claim 5, wherein said second write transaction is formed using said byte lane strobe data to form a mask for selecting which bytes within said cached line of data should be bytes written to said shared memory by said second write transaction.

8. An apparatus for processing data comprising:
    a shared memory;
    a first transaction master;
    a second transaction master including a local cache memory; and memory interconnect circuitry, said shared memory external to said interconnect circuitry, said circuitry comprising:
  write control circuitry configured to respond to a write unique transaction received from said first transaction master to write data from one or more selected portions of a write line of data to said shared memory by:
    (i) storing portion data identifying said one or more selected portions within said write line of data;
    (ii) sending a first snoop request to said second transaction master requesting, if said local cache of said second transaction master is storing a cached line of data corresponding to said write line of data within said shared memory, said second transaction master to invalidate said cached line of data within said local cache and to send said cached line of data to said write control circuitry;
    (iii) sending to said shared memory a first write transaction for writing into said shared memory at least said data from said one or more selected portions of said write line of data without waiting for any said cached line of data to be received from said second transaction master; and
    (iv) when said cached line of data is received from said second transaction master, using said portion data to identify one or more remaining portions of said cached line of data that do not correspond to said one or more selected portions within said write line of data and sending to said shared memory a second write transaction for writing into said shared memory data from said one or more remaining portions of said cached line of data but not data from said cached line of data corresponding to said one or more selected portions of said write line of data; and
  serialisation circuitry coupled to said write control circuitry and configured to stall any transaction requests to said shared memory corresponding to said write line of data until said first write transaction, any invalidation of said cached line of data and any said second write transaction are indicated as completed.

9. An apparatus as claimed in claim 8, wherein at least said first transaction master, said second transaction master and said memory interconnect circuitry are all formed within an integrated circuit.

10. An apparatus as claimed in claim 8, wherein said first transaction master is configured not to cache all data for writing to said shared memory by said first transaction master.

11. An apparatus as claimed in claim 10, wherein said first transaction master is a graphics processing unit and said data for writing is pixel data for writing to a frame buffer stored within said shared memory.

12. A memory interconnect apparatus for connecting an external shared memory means for storing data with a first transaction master means for issuing transactions and a second transaction master means for issuing transactions, at least said second transaction master means including a local cache memory means for storing data, said memory interconnect apparatus comprising:
  write control means for responding to a write unique transaction received from said first transaction master means to write data from one or more selected portions of a write line of data to said shared memory means by:
    (i) storing portion data identifying said one or more selected portions within said write line of data;
    (ii) sending a first snoop request to said second transaction master means requesting, if said local cache means of said second transaction master means is storing a cached line of data corresponding to said write line of data within said shared memory means, said second transaction master means to invalidate said cached line of data within said local cache means and to send said cached line of data to said write control means;
    (iii) sending to said shared memory means a first write transaction for writing into said shared memory means at least said data from said one or more selected portions of said write line of data without waiting for any said cached line of data to be received from said second transaction master means; and
    (iv) when said cached line of data is received from said second transaction master means, using said portion data to identify one or more remaining portions of said cached line of data that do not correspond to said one or more selected portions within said write line of data and sending to said shared memory means a second write transaction for writing into said shared memory means data from said one or more remaining portions of said cached line of data but not data from said cached line of data corresponding to said one or more selected portions of said write line of data; and
  serialisation means, coupled to said write control means, for stalling any transaction requests to said shared memory means corresponding to said write line of data until said first write transaction, any invalidation of said cached line of data and any said second write transaction are indicated as completed.

13. A method of connecting an external shared memory with a first transaction master and a second transaction master, at least said second transaction master including a local cache memory, said method comprising the steps of:
  using write control circuitry to respond to a write unique transaction received from said first transaction master to write data from one or more selected portions of a write line of data to said shared memory by:
    (i) storing portion data identifying said one or more selected portions within said write line of data;
    (ii) sending a first snoop request to said second transaction master requesting, if said local cache of said second transaction master is storing a cached line of data corresponding to said write line of data within said shared memory, said second transaction master to invalidate said cached line of data within said local cache and to send said cached line of data to said write control circuitry;
    (iii) sending to said shared memory a first write transaction for writing into said shared memory at least said data from said one or more selected portions of said write line of data without waiting for any said cached line of data to be received from said second transaction master; and
    (iv) when said cached line of data is received from said second transaction master, using said portion data to identify one or more remaining portions of said cached line of data that do not correspond to said one or more selected portions within said write line of data and sending to said shared memory a second write transaction for writing into said shared memory data from said one or more remaining portions of said cached line of data but not data from said cached line of data corresponding to said one or more selected portions of said write line of data; and
  stalling any transaction requests to said shared memory corresponding to said write line of data until said first write transaction, any invalidation of said cached line of data and any said second write transaction are indicated as completed.

14. A method as claimed in claim 13, comprising using said write control circuitry to respond to a write line unique transaction received from said first transaction master to write a full write line of data to said shared memory by:
  (i) sending a second snoop request to said second master requesting, if said local cache of said second master is storing a full cached line of data corresponding to said full write line of data within said shared memory, said second transaction master to invalidate said cached line of data within said local cache; and
  (ii) sending to said shared memory a third write transaction for writing into said shared memory said full write line of data without waiting for any second snoop response to said second snoop request; and
  stalling any transaction requests to said shared memory corresponding to said full write line of data until said second snoop response is received and said third write transaction is indicated as completed.

* * * * *